United States Patent [19]

Freeman et al.

[11] 4,023,688

[45] May 17, 1977

[54] SILO FILLING APPARATUS

[75] Inventors: Andrew S. Freeman, W. Lafayette; John R. Haan, Mulberry, both of Ind.

[73] Assignee: Even Flo Silage Distributor, Inc., Lafayette, Ind.

[22] Filed: Apr. 29, 1976

[21] Appl. No.: 681,416

[52] U.S. Cl. .............................. 214/17 C; 302/60
[51] Int. Cl.² ........................................ B65G 65/30
[58] Field of Search .............. 214/17 C; 302/60, 61

[56] References Cited
UNITED STATES PATENTS 2,650,136  8/1953  Raleigh ................................ 302/60
3,570,688  3/1971  Ryder et al. ...................... 214/17 C Primary Examiner—Robert G. Sheridan
Attorney, Agent, or Firm—Woodard, Weikart, Emhardt & Naughton

[57] ABSTRACT

Disclosed is an apparatus for completely filling a silo from a central point at the top of the silo. Silage is dropped from a centered discharge opening in a fill tube extending from the upper margin of the silo sidewall. The fill tube is articulated intermediate its length and the innermost portion is swung sidewardly when the apex of the deposited silage reaches the discharge opening. A spreader plate is then positioned in cooperative relation with the open end of the stationary outermost portion of the fill pipe and directs the final volume of silage (necessary to fill the silo) toward the far wall area of the silo. A locking member carried by the spreader plate assures that the two sections of the fill pipe are held in longitudinal axial alignment.

11 Claims, 7 Drawing Figures

SILO FILLING APPARATUS

BACKGROUND OF THE INVENTION

Center filling of a silo by a powered rotating distributor which is adjustably positioned on the vertical axis of the silo is not unknown in the prior art and a filling apparatus performing this function is shown in Freeman U.S. Pat. No. 3,337,065. Such powered distributors hurl the silage toward the outer wall of the silo as it leaves the discharge opening. Some silo filling devices must be adjusted at intervals as the silo fills. In these devices, since no central core of deposited silage exits, the stability of the silage column can be uncertain. At the top of the filled silo, that is, as loading is completed, hand leveling must be undertaken. With many powered distributor filling systems the final filling increment of the silo must be deposited and leveled by forking the silage.

The apparatus of the present invention permits substantially the entire silo to be filled without adjustment of the position of the fill tube. A single, central filling core is provided to the silage column, and stability of the silo-enclosed column is thus enhanced. There is little separation of dense and lighter components of the silage during filling of the silo. These qualities are attained by the apparatus of the present invention even though it is of relatively simple, low-cost construction.

DESCRIPTION OF THE PREFERRED EMBODIMENT

Figure 1:
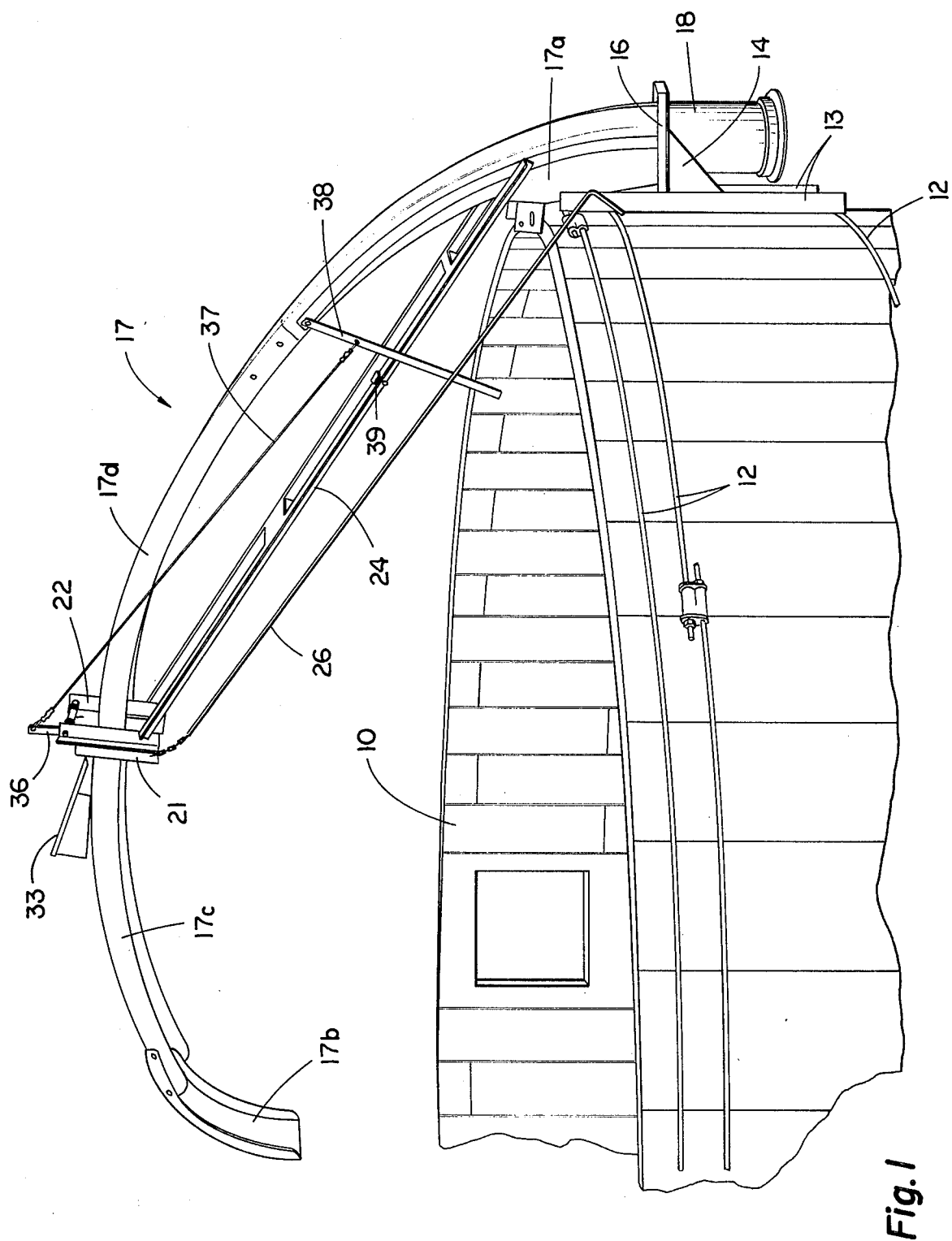
FIG. 1 is a side, perspective view of a filler apparatus embodying the present invention.

Referring initially to FIG. 1, there is shown a conventional silo of cylindrical configuration and having sidewall 10 (the roof being omitted). The silo is provided with the conventional hoops 12 spaced along its height and angle irons 13 are attached to the two top hoops. The angle irons carry gussets 14 which are attached to the rectangular flange 16 formed at the lower end of a fill tube or pipe indicated generally at 17. The base section 17a of the fill tube is generally rectangular in cross-section and totally enclosed, however, above the base section, as will be evident from FIG. 4, the under portion of the fill tube is open, formed in an inverted channel configuration. Attached to the lower end of the base section 17a, below the flange 16, is a section of cylindrical pipe 18 which receives material, such as silage, from the conventional blower pipe used for filling silos of the type here under consideration.

The fill tube 17 extends radially in a generally arcuate configuration, over the upper end of the silo and has its free or discharge end 17b located at the central vertical axis of the silo. The fill tube is hinged intermediate its ends, the hinge being formed by facing, transverse frames 21 and 22 which are rigidly secured, respectively, to the extending portion 17c and the stationary portion 17d of the fill tube. The frames 21 and 22 are each provided with adjacent, sidewardly extending portions 21a and 22a, respectively, (FIG. 3) which form bearings receiving a vertical hinge pintle 23 providing the hinge axis. It will be understood that only the upper hinge component is visible in FIG. 3, (upper and lower pintles are visible in FIG. 4) however, while dual, spaced hinge components are utilized, a single hinge and pintle would also adequately perform the hinge function. It will be understood that counterparts of the extending portions 21a and 22a might be formed on the adjacent side members of the frames 21 and 22 opposite those carrying the sidewardly extending portions in FIGS. 3 and 4. Such arrangement would permit, alternatively, hinging the portion 17c of the fill tube on the opposite side from that shown to permit it to swing in opposite direction should an obstruction prevent the hinged movement indicated in FIG. 4.

Diagonal, stationary braces 24 extend from frame 22 to the portion 17a and a rod 26, having one end accessible for manipulation adjacent the supported end of the fill tube, is flexibly connected, by a short length of chain or the like, to the frame 21 which is rigidly attached to the extending portion 17c of the fill tube. Manipulation of rod 26 serves to swing the extending portion 17c sidewardly about the vertical hinge pintle 23 into a position in which it is stowed beside the staionary fill tube portion 17d, the stowed position being illustrated in FIG. 4.

Figure 2:
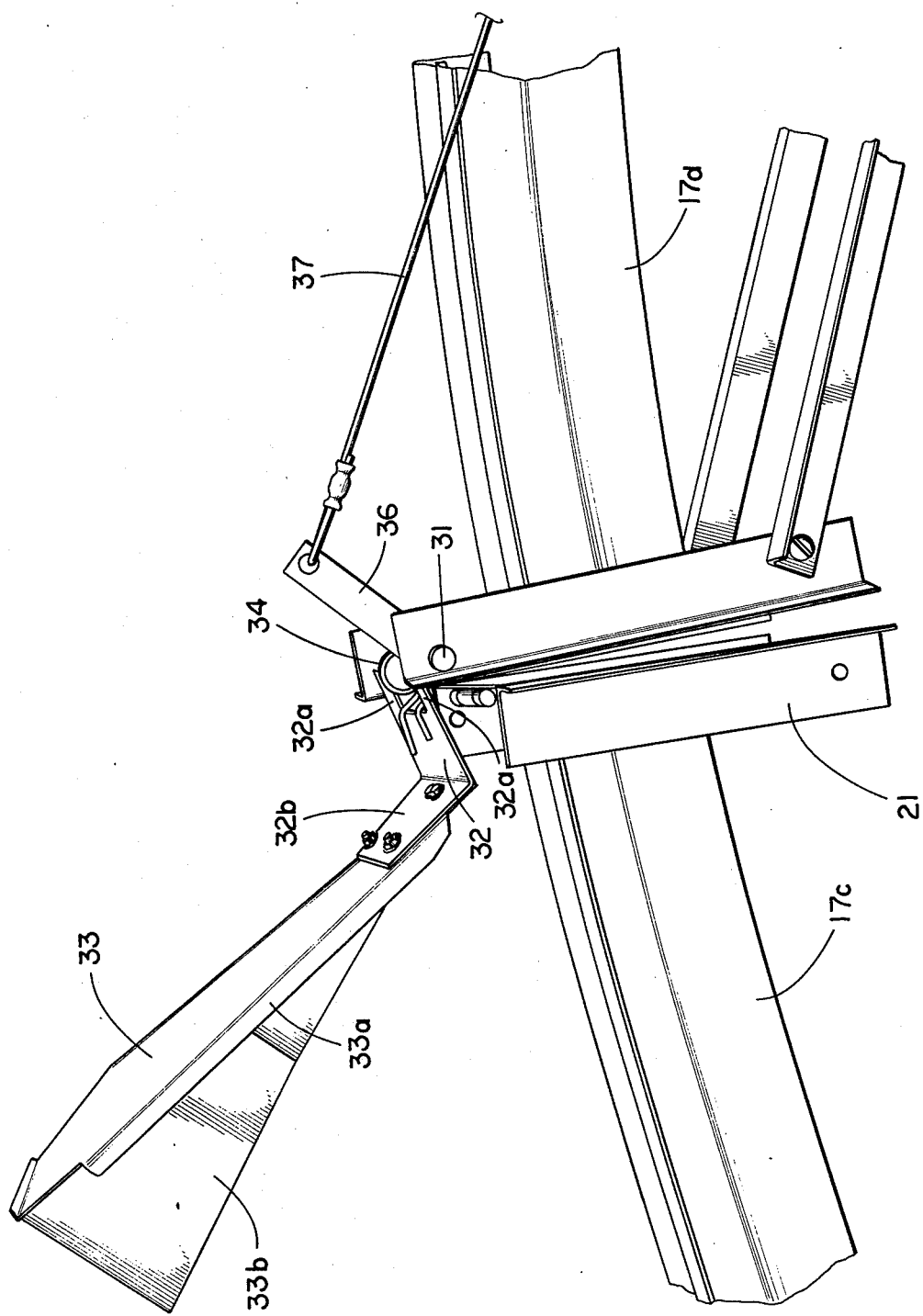
FIG. 2 is an enlarged, side view of a portion of the apparatus shown in FIG. 1.
Figure 3:
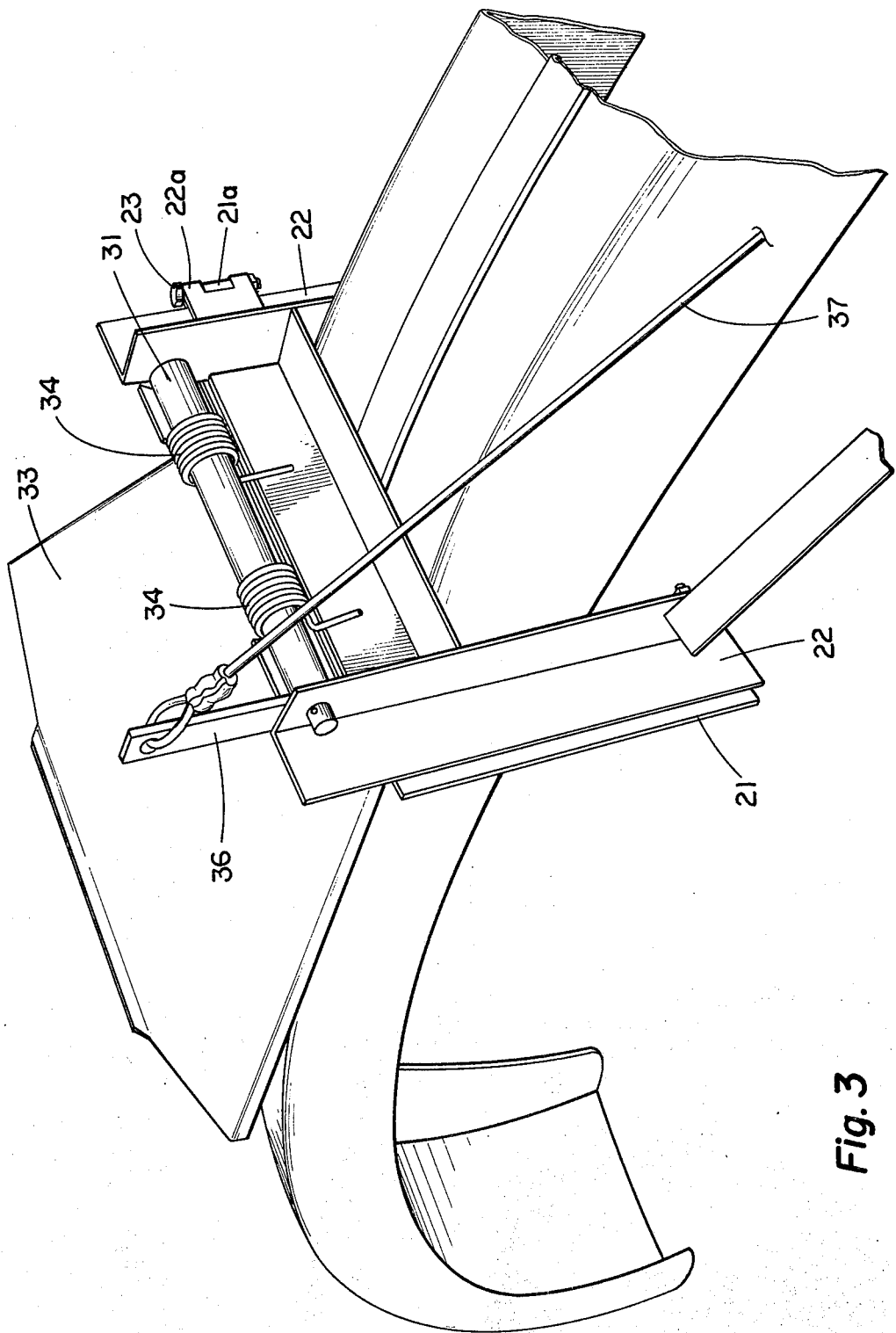
FIG. 3 is an enlarged, perspective view of the apparatus shown in FIG. 2 but taken generally from the rear thereof.

Referring now primarily to FIGS. 2 and 3, the vertical members of the frame 22 are extended upwardly and have bearing apertures receiving a horizontal hinge pin 31. Welded, or otherwise rigidly secured, to the pin are extending ears 32a formed as part of a locking member or bracket 32. The bracket has a portion 32b extending normal to the bracket body which is rigidly attached to a polygonal spreader plate 33. The plate has downturned side margins 33a and, as may be seen in FIG. 4, two depending flanges 33b extend from the underface of the spreader plate and are arranged in diverging, V-shaped configuration. Resilient means taking the form of torsion springs 34 function to bias the member 32 and, consequently, the spreader plate into lowered position, that is, counterclockwise about pin 31 as viewed in FIG. 2.

A crank arm 36 is rigidly attached to and extends radially from the pin 31. Attached to the arm is a cable 37 which extends to a bar 38 (FIG. 1) pivotally secured to the side of fill tube portion 17. The bar 38 may be manipulated to control the angular position or attitude of the spreader plate 33. A sliding clamp stop 39 on bracing member 24 may be utilized to provide an adjustably positionable stop for the clamp bar 38 thus fixing plate 33 in the desired angular position. The adjustability, thus provided, for the angular position of plate 33 is an important feature of the invention. Because of the wide variation in upper silo construction (for example, some are roofed, some are not, etc.) it is important that plate 33 utilized in the final portion of the filling cycle be capable of being positioned at the correct inclination to give the final filling portion of the filling cycle a configuration best suited to the particular silo being filled. The limits of this adjustability are, as will be evident in FIG. 2, the maximum upward position shown and the maximum lowered position defined when member 32 abuts the frame 22.

Figure 5:
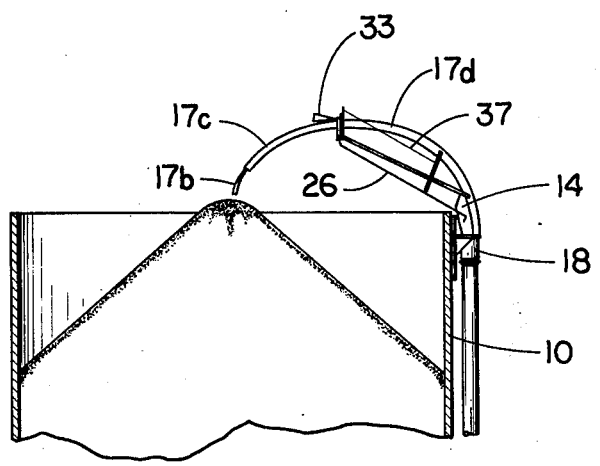
FIG. 5 is a schematic, side view illustrating the apparatus in operation.
Figure 6:
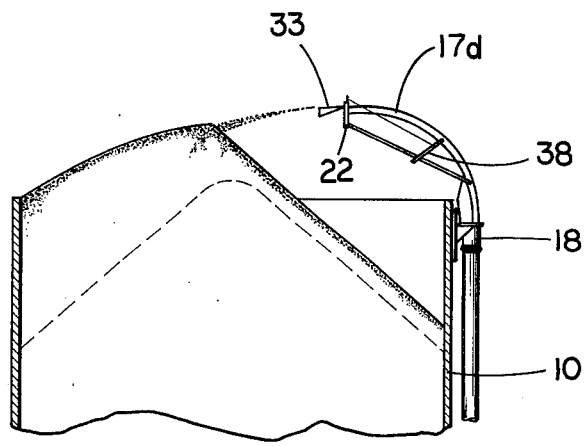
FIG. 6 is a schematic, side view of the apparatus at a further point in its operation.
Figure 7:
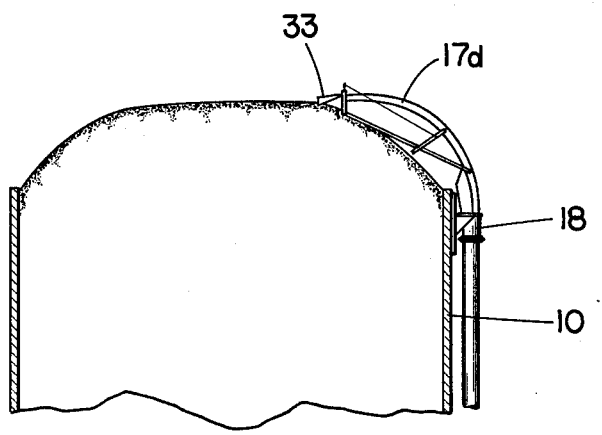
FIG. 7 is a schematic, side view of the apparatus illustrating the final, full condition of the silo.

The operation of the apparatus will now be described with particular reference to FIGS. 5, 6 and 7. As may be seen in FIG. 5, the silo may be filled with silage through fill tube 17. The silage, dropping from discharge 17b, fills the silo, the top portion assuming a conical configuration with, in the case of corn silage, an approximately 45° slope. When the apex of the cone reaches fill tube discharge 17b, movement of silage through the tube is temporarily halted and, by pivotally moving bar 38, the spreader plate is raised about its pivot axis 31. This removes member 32 from locking position with relation frames 21 and 22, this releasing position being illustrated in FIG. 2.

Figure 4:
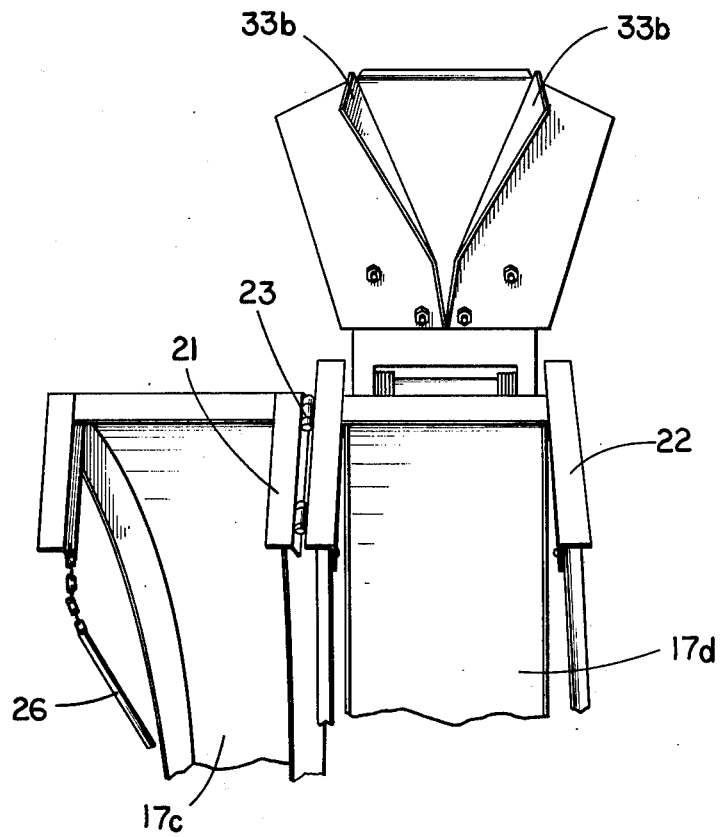
FIG. 4 is a perspective, bottom view of a portion of the apparatus showing the extending portion of the fill tube moved to stowed position.

The extending portion 17c of the fill tube is then moved sidewardly about vertical hinge pintle 23 into stowed position adjacent the stationary portion 17d (FIG. 4). This motion is accomplished by manipulation of rod 26, as previously mentioned. The spreader plate 33 may then be lowered by means of bar 38 so that the plate assumes the desired angle with relation to the fill tube. Filling of the silo is then resumed and the final increment of the silo volume is thereafter filled. This final filling is illustrated in FIGS. 6 and 7. The stationary portion 17d of the fill tube in cooperation with spreader plate 33 directs dual, diverging (because of the presence of flanges 33b) streams of silage to the far wall of the silo and this fills in the open areas around the cone apex of FIG. 5 as will be apparent from FIGS. 6 and 7. As shown in FIG. 7, filling can proceed into the roof area of the silo and only minor hand leveling operations are necessary, at worst, to top off the silo contents so that the conventional silo unloader (not shown) may be put into operation.

The apparatus permits filling of approximately 90% of the silo volume without any positional adjustment of the extended fill tube. When filling is almost completed, only one trip to the top of the silo is necessary to adapt the assembly for filling the final increment of silo volume. The silage is layed down uniformly, with single core stability of the silage column and the silo may be filled into the roof area. Only minimal leveling work is necessary after filling.

While the invention has been disclosed and described in some detail in the drawings and foregoing description, they are to be considered as illustrative and not restrictive in character, as other modifications within the scope of the invention may readily suggest themselves to persons skilled in the art.

We claim:

1. Apparatus for completely filling a silo by depositing silage from a central point adjacent the upper end of a silo, said apparatus comprising a fill tube having an arcuate configuration and supported at one of its ends adjacent the upper margin of the silo and extending radially across the top of the silo to locate the free end of the fill tube at the central vertical axis of the silo, the supported end of said fill tube being adapted to receive silage with the silage moving through the fill tube and dropping from the free end thereof downwardly into the silo, said fill tube being hinged intermediate its ends on a vertical pintle disposed adjacent one side of said tube to permit the outer portion of the fill tube to swing sidewardly with relation to the stationary portion when the apex of the silage deposited in the silo reaches said free end of the fill tube, and a spreader plate hinged on a horizontal axis to the stationary portion of the fill tube and movable into cooperating relation with said stationary portion after said extending portion has swung sidewardly to thereafter direct the flow of silage from said stationary portion toward the far wall of the silo.

2. A silo filling apparatus as claimed in claim 1 in which the face of said spreader plate nearest the flow of silage from said stationary portion after said extending portion has swung sidewardly is provided with depending guide members to divide the flow of silage directed to the far wall of the silo into a plurality of streams.

3. A silo filling apparatus as claimed in claim 1 in which said spreader plate face is provided with two depending guide members formed to divide said far wall directed flow of silage into two diverging streams.

4. A silo filling apparatus as claimed in claim 1 including a rod having one end accessible for manipulation adjacent said supported one end of said fill tube and flexibly connected at its other end to said extending portion of the fill tube whereby said rod may be manipulated to swing said extending portion sidewardly about said vertically extending hinge pintle.

5. A silo filling apparatus as claimed in claim 1 in which said spreader plate is provided with means accessible for manipulation adjacent said supported one end of the fill tube, said means permitting remote pivotal movement of said plate about its horizontal hinge axis.

6. A silo filling apparatus as claimed in claim 5 in which adjustably movable stop means is provided for limiting the pivotal movement of said spreader plate and thereby establishing the adjusted angular position of said plate with relation to its horizontal hinge axis.

7. A silo filling apparatus as claimed in claim 1 in which said extending portion and said stationary portions of the fill tube each have a transverse frame secured to its exterior face adjacent said vertical hinge pintle, said frames being in contiguous registration when said extending and stationary portions of the fill tube are axially aligned, and a member carried by said spreader plate for locking said frames in registering position.

8. A silo filling apparatus as claimed in claim 7 in which pivotal motion of said spreader plate about its horizontal hinge axis displaces said locking member to free said registering frames for sideward displacement of said extending portion of the fill tube.

9. A silo filling apparatus as claimed in claim 8 in which there is provided a resilient means for biasing said locking member into a position locking said frames in registering position.

10. A silo filling apparatus as claimed in claim 7 in which each of said frames is provided with sidewardly extending portions forming bearings receiving said vertical hinge pintle, and the frame secured to said stationary portion has vertically extending portions receiving a pintle which defines said horizontal hinge axis for the spreader plate.

11. A silo filling apparatus as claimed in claim 10 in which a crank arm extends radially from said horizontal hinge axis pintle for controlling by its positioning the attitude of said spreader plate.

* * * * *